(12) United States Patent
Cui et al.

(10) Patent No.: US 11,985,530 B2
(45) Date of Patent: May 14, 2024

(54) TECHNOLOGIES FOR PROXIMITY SENSING WITH CONFIGURED GAPS

(71) Applicant: Apple Inc., Cupertino, CA (US)

(72) Inventors: Jie Cui, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 329 days.

(21) Appl. No.: 17/440,664

(22) PCT Filed: May 4, 2021

(86) PCT No.: PCT/CN2021/091806
§ 371 (c)(1),
(2) Date: Sep. 17, 2021

(87) PCT Pub. No.: WO2022/232961
PCT Pub. Date: Nov. 10, 2022

(65) Prior Publication Data
US 2023/0269615 A1 Aug. 24, 2023

(51) Int. Cl.
| | | |
|---|---|---|
| H04W 36/08 | (2009.01) |
| G01S 7/00 | (2006.01) |
| G01S 13/00 | (2006.01) |
| G01S 13/04 | (2006.01) |
| H04W 24/10 | (2009.01) |
| H04W 36/12 | (2009.01) |
| H04W 36/14 | (2009.01) |
| H04W 36/18 | (2009.01) |
| H04W 36/30 | (2009.01) |

(52) U.S. Cl.
CPC ............. *H04W 24/10* (2013.01); *G01S 7/006* (2013.01); *G01S 13/003* (2013.01); *G01S 13/04* (2013.01)

(58) Field of Classification Search
CPC ...... H04W 24/10; G01S 7/006; G01S 13/003; G01S 13/04; G01S 13/06; G01S 13/08
See application file for complete search history.

(56) References Cited

U.S. PATENT DOCUMENTS

| | | | | |
|---|---|---|---|---|
| 2014/0094162 A1* | 4/2014 | Heo | ................... | H04W 52/0258 455/422.1 |
| 2020/0014523 A1* | 1/2020 | Huang | .................... | H04L 5/001 |

FOREIGN PATENT DOCUMENTS

| | | |
|---|---|---|
| CN | 102113376 | 6/2011 |
| WO | 2018171730 | 9/2018 |

OTHER PUBLICATIONS

3rd Generation Partnership Project; Technical Specification Group Radio Access Network; NR; Requirements for support of radio resource management (Release 16), 3GPP TS 38.133 V15.11.0, Sep. 2020, 1198 pages.

(Continued)

*Primary Examiner* — Moustapha Diaby
(74) *Attorney, Agent, or Firm* — Kilpatrick Townsend & Stockton LLP

(57) ABSTRACT

The present application relates to devices and components including apparatus, systems, and methods for performing body proximity sensing operations based on uplink or measurement gaps.

20 Claims, 10 Drawing Sheets

(56) References Cited

OTHER PUBLICATIONS

3rd Generation Partnership Project; Technical Specification Group Radio Access Network; NR; Requirements for support of radio resource management (Release 16), 3GPP TS 38.133 V16.5.0, Sep. 2020, 1608 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
Discussion on UL Gaps for Self-Calibration and Monitoring, Apple, 3GPP TSG-RAN WG4 Meeting #97-e, R4-2014218, Nov. 2-13, 2020, 19 pages.
UL Gaps for Tx Power Management, Apple, 3GPP TSG-RAN WG4 Meeting #98-e, R4-2100218, Jan. 25-Feb. 5, 2021, 7 pages.
International Patent Application No. PCT/CN2021/091806, International Search Report and Written Opinion, dated Jan. 27, 2022, 9 pages.
International Patent Application No. PCT/CN2021/091806, International Preliminary Report on Patentability, Nov. 16, 2023, 5 pages.

* cited by examiner

TECHNOLOGIES FOR PROXIMITY SENSING WITH CONFIGURED GAPS

CROSS-REFERENCES TO RELATED APPLICATIONS

This application is a U.S. National Stage Application of PCT/CN2021/091806 filed May 4, 2021. The disclosure of which is herein incorporated by reference in its entirety for all purposes.

BACKGROUND

Third Generation Partnership Project (3GPP) Technical Specifications (TSs) define standards for wireless networks. These TSs includes details relating to configuration of measurement gap resources.

DETAILED DESCRIPTION

Figure 1:
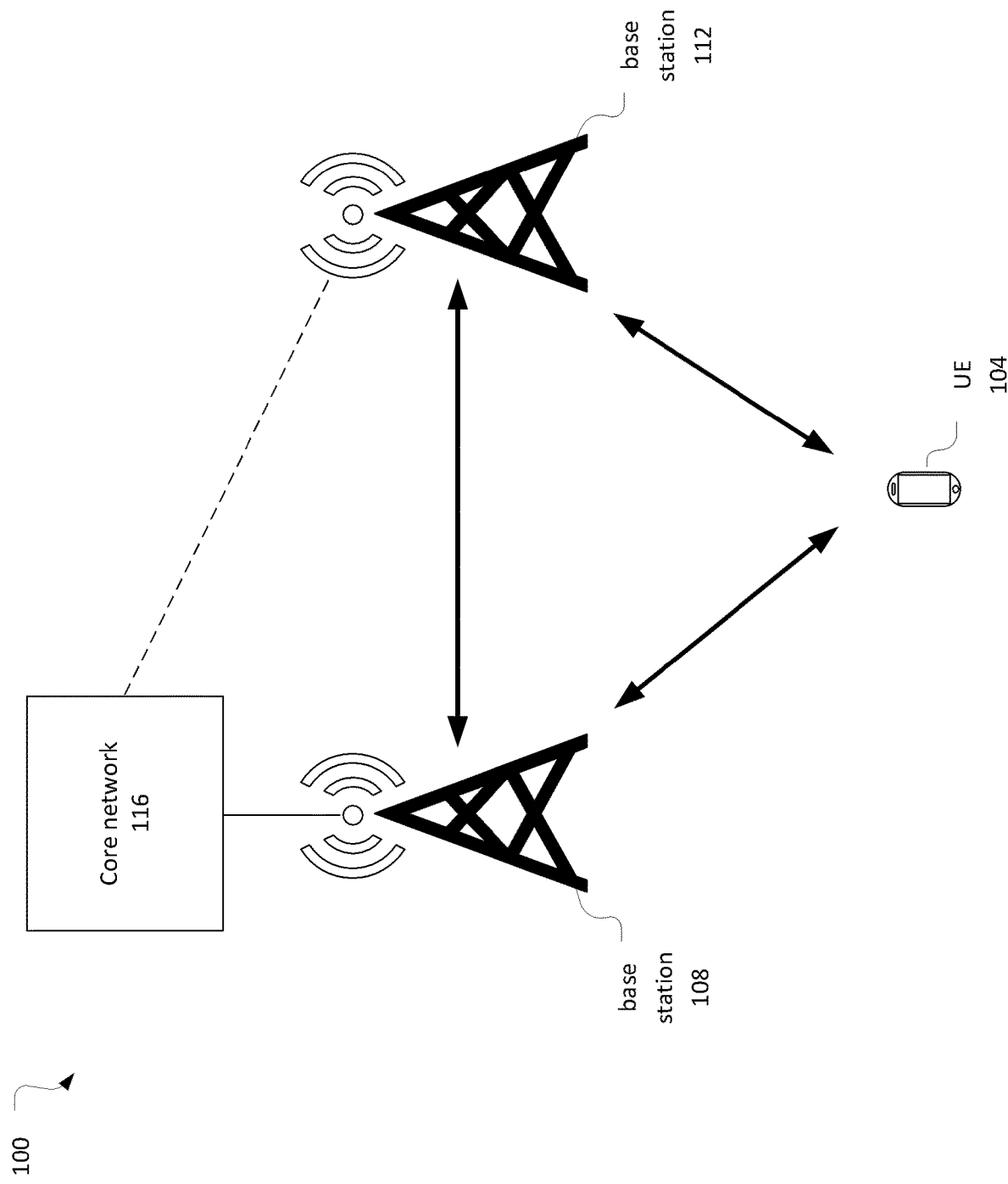
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, a programmable system-on-a-chip (SoC)), or digital signal processor (DSP)) that is configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base station, such as base station 108 and base station 112. The UE 104 and the base stations 108/112 may communicate over air interfaces compatible with 3GPP TSs such as those that define Long Term Evolution (LTE) and Fifth Generation (5G) new radio (NR) system standards. The base stations 108/112 may include an evolved node B (eNB) to provide one or more LTE evolved universal terrestrial radio access (E-UTRA) cells for E-UTRA user plane and control plane protocol terminations toward the UE 104. The base stations 108/112 may additionally/alternatively include a next generation node B (gNB) to provide one or more 5G NR cells for NR user plane and control plane protocol terminations toward the UE 104.

The base stations 108/112 may be considered neighbor base stations that provide coverage for adjacent geographical locations. In some embodiments, the base stations 108/112 may provide overlapping coverage and may cooperate with one another to provide service to the UE 104 through a dual connectivity (DC) operation. In a DC operation, the UE 104 may be configured to utilize radio resources provided by distinct schedulers located in the base station 108 and the base station 112. The base stations may be coupled with each other via an X2 interface over an ideal or non-ideal backhaul.

In a DC operation, one of the base stations may be configured as a master node (MN) to provide a control plane connection to the core network 116. The MN may be associated with the group of serving cells referred to as a master cell group (MCG). The other base station may be configured as a secondary node (SN), which may not have a control plane connection to the core network 116. The SN may be used to provide additional resources to the UE 104. The SN may be associated with a group of serving cells referred to as a secondary cell group (SCG). The configuration may be an NE-DC configuration if the MN is a gNB and the SN is an eNB; an EN-DC configuration if the MN is an eNB and the SN is a gNB; and an NR-DC if both the MN and the SN or gNBs.

The cells provided by the base stations 108/112 may be in: frequency range 1 (FR1), corresponding to frequency range 410 MHz-7125 MHz; frequency range 2 (FR2) corresponding to frequency range 24,250 MHz-52,600 MHz; or a higher frequency range.

When operating in the higher frequency ranges, for example, FR2 and above, the UE 104 may often engage in beamforming by focusing the transmit beams in a direction toward the receiving base station. To ensure the selected direction (and power) of the uplink transmit beam is suitable and complies with maximum permitted exposure (MPE) regulations, the UE 104 may perform a body proximity sensing (BPS) operation to detect presence of a nearby body. A BPS operation may include transmitting a low-power sensing signal and using a receiver of the UE 104 to measure reflections of the sensing signal to determine human body proximity.

The base stations 108/112 may configure an uplink gap dedicated for BPS to allow the UE 104 to transmit the sensing signal. The dedicated uplink gap may compromise UE throughput and impact network capacity. The uplink gap on one component carrier may also impact or interrupt other component carriers.

The base stations 108/112 may also configure the UE 104 with a measurement gap (MG) for legacy mobility measurements. The mobility measurements may facilitate connection handovers as the UE 104 moves from one area of network coverage to another. Embodiments of the present disclosure describe utilizing such legacy MGs for BPS sensing. This may reduce, or eliminate, the need to use uplink gaps for this purpose. Some examples of MG-based BPS sensing are briefly introduced as follows.

In a first example, the MG-based BPS sensing may be enabled by leveraging the MG-based interruption for BPS sensing given that the interruption for MG may be longer than the expected measurement gap length (MGL). This may be the case for unsynchronized cells.

In a second example, the MG-based BPS sensing may leverage a portion of the legacy MG for BPS. The UE 104 may utilize some portion of the radio frequency (RF) tuning/retuning allocation of a per-UE MG for BPS.

In a third example, the MG-based BPS sensing may utilize time division duplex (TDD) configuration information or downlink signal information to determine which symbols of a MG are available for BPS sensing.

In a fourth example, the MG-based BPS sensing may utilize interruption on an uplink carrier that may be due to a timing advance.

Embodiments encompassing these and other examples will be described in further detail herein.

Figure 2:
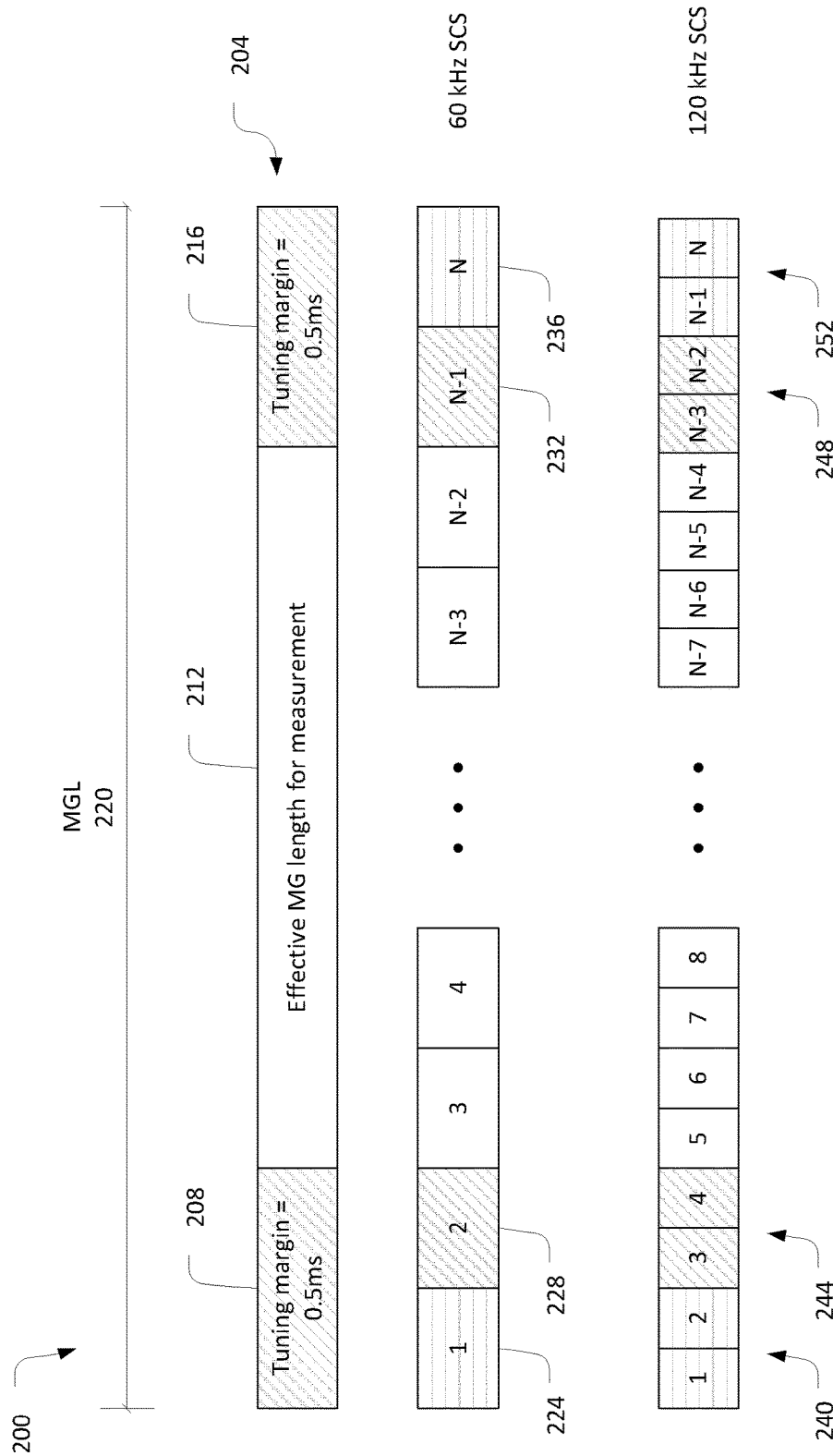
FIG. 2 illustrates a resource diagram in accordance with some embodiments.

FIG. 2 is a resource diagram 200 in accordance with some embodiments. The resource diagram 200 includes a measurement gap 204 that includes a first tuning margin 208, an effective MGL for measurement 212, and a second tuning margin 216. The measurement gap 204 may include an overall MGL 220 that encompasses both tuning margins and the effective MGL for measurement 212.

Briefly, the UE 104 may be configured to perform measurements within the measurement gap 204. The base stations 108/112 may configure measurement objects (MOs) to the UE 104 to identify time and frequency location of downlink signals that are to be measured in the measurement gap 204. The signals to be measured may be synchronization signal/physical broadcast channel block (SSB) transmissions or channel state information-reference signal (CSI-RS) transmissions. In some embodiments, the base stations 108/112 may configure the UE 104 with an MO to perform layer 3 (L3) measurements based on CSI-RS symbols on a target frequency layer that is an intra-frequency layer (for example, target cell is on same frequency layer as the serving cell) or an inter-frequency layer (for example, target cell is on a frequency layer different from the serving cell). Unless otherwise described, the CSI-RS based L3 measurements may be performed similar to that described with respect to section 9.10 of 3GPP TS 38.133 V17.1.0 (2021-03).

At 208, the UE 104 may tune its RF circuitry from a first frequency layer of a serving cell to a second frequency layer of a target cell that includes the signals to be measured. The UE 104 may perform the measurements during the effective MG length for measurement 212. At 216, the UE 104 may tune its RF circuitry back to the first frequency layer for further communications on the serving cell.

The measurement gap 204 may be a per-UE MG (for example, configured specifically for the UE 104) configured for measurements in a target frequency layer that is in FR2 or a higher frequency. The tuning margins 208/216 may have lengths of 500 microseconds (µs) (or 0.5 milliseconds (ms)). However, the UE 104 may not need the entire length of the tuning margin 208/216 to perform the RF tuning. The UE 104 may then be able to use a first portion of the tuning margin for a BPS operation and a second portion of the tuning margin for the RF tuning. In some embodiments, this extra margin may be available if the UE 104 supports per-FR MG, but the network configures it with a per-UE MG for FR2 sensing.

Consider, for example, that the UE 104 is capable of RF tuning in 250 µs. In this case, if the serving cell has a 60 kilohertz (kHz) subcarrier spacing (SCS), the UE 104 may use a first slot 224 for a BPS operation (for example, sending a BPS signal and receiving/measuring the reflection) and a second slot 228 for tuning RF circuitry to the target frequency layer. The UE 104 may also use a slot that follows the effective MG length for measurement 212 for a BPS operation. For example, slot N-1 232 that immediately follows the effective MG length for measurement 212 may be used to tune the RF circuitry from the target frequency layer to the serving cell frequency layer. Then slot N 236 may be used to perform the BPS operation.

If the UE 104 is capable of RF tuning in 250 µs and the serving cell has a 120 kHz SCS, the UE 104 may use first and second slots 240 for BPS operation (for example, sending a BPS signal and receiving/measuring the reflection) and third and fourth slots 244 for tuning RF circuitry to the target frequency layer. The UE 104 may then use slots N-3 and N-2 248 for tuning the RF circuitry from the target frequency layer to the serving cell frequency layer and slots N-1 and N 252 to perform the BPS operation.

The portion of the tuning margin used before or after the effective measurement gap length for measurement 212 may be defined by a portion ratio of X %. As shown in FIG. 2, X=50%, with half of the tuning margins 208/216 being used for BPS operations. The value X may be defined by a 3GPP TS, predefined in a UE implementation, or dynamically configured by a network.

Some embodiments describe using TDD configuration or downlink signal (for example, SSB/CSI-RS) information to determine portions of a measurement gap that may be used for BPS sensing.

If a measurement gap is for an intra-frequency measurement (for example, the serving cell and the neighbor cell are on the same frequency layer, which may be FR2 or higher), one or more of the following three options may be used.

In a first option, since all the cells on an intra-frequency layer are assumed to be synchronized, the UE 104 may use one or more symbols other than the SSB symbols or CSI-RS layer 3 (L3) symbols of the serving cell and neighbor cell within the MG to perform a BPS sensing transmission. The SSB symbols may be based on actual detected SSB symbols for a serving cell or neighbor cell. For example, if the UE 104 detects an SSB transmission on a set of symbols, the UE 104 may determine that the set of symbols in subsequent frames (or half frames) are not available for BPS operations. Alternatively, the SSB symbols may be all symbols that are candidates for an SSB transmission, whether or not they correspond to symbols upon which an SSB transmission has been detected.

The CSI-RS symbols that may be avoided may be configured CSI-RS L3 symbol positions. These symbol positions may be specifically configured to the UE 104 by a serving base station. For example, the serving base station may provide an indication of the CSI-RS symbols that are to be used for both the serving cell and the neighbor cell. The UE 104 may derive the positioning of the CSI-RS symbols of the neighbor cell based on a reference timing from the serving cell.

In a second option, the UE 104 may determine symbols that may be used for BPS operations based on a serving cell TDD UL/DL configuration or an intra-frequency neighbor cell TDD UL/DL configuration. For example, the UE 104 may use one or more uplink symbols based on the selected TDD UL/DL configuration within a measurement gap to perform the BPS sensing transmission.

In a third option, the network (for example, base station 108/112) may signal a TDD UL/DL configuration to the UE 104. The UE 104 may then use one or more uplink symbols based on the indicated TDD UL/DL configuration within the measurement gap to perform the BPS sensing transmission (for example, the UE 104 may perform the BPS sensing transmission during the one or more uplink symbols).

If a measurement gap is used for an inter-frequency measurement (for example, serving cell and the neighbor cell are on different frequency layers, which may be in FR2 or higher), one or more of the following three options may be used.

In a first option, since all cells on a same frequency layer are assumed to be synchronized, the UE 104 may first detect SSB symbols on at least one cell of the target inter-frequency layer. The UE 104 may then use one or more symbols other than the SSB symbols or CSI-RS L3 symbols of this cell within a measurement gap to perform BPS sensing transmission (for example, the UE 104 may perform the BPS sensing transmission during the one or more symbols other than the SSB/CSI-RS L3 symbols).

Similar to the discussion above, the SSB symbols to be avoided may be based on actual detected SSB symbols for the cell of the target inter-frequency layer or may include symbols on all possible SSB symbol positions.

The CSI-RS symbols that may be avoided may be configured CSI-RS L3 symbol positions. These symbol positions may be specifically configured to the UE 104 by a serving base station. The UE 104 may derive positioning of the CSI-RS symbols of the neighbor cell based on a reference timing from the cell of the target inter-frequency layer.

In a second option, the UE 104 may read system information (SI) (for example, in a system information block 1 (SIB1)) of at least one cell on the target inter-frequency layer to detect the cell's TDD UL/DL configuration, The UE 104 may then use one or more uplink symbols based on the cell's TDD UL/DL configuration within the measurement gap to perform the BPS sensing transmission.

In a third option, the network (for example, the serving base station) signal the TDD UL/DL configuration to the UE 104. The UE 104 may then use one or more uplink symbols based on the signaled TDD UL/DL configuration within the measurement gap to perform the BPS sensing transmission.

An uplink timing advance (TA) may cause the measurement gap to interrupt transmissions adjacent to the measurement gap. For example, section 9.11 of 3GPP TS 38.133 provides:

It is up to UE implementation whether or not the UE is able to conduct transmission in the following slot(s),
when MGTA is not applied, in the L consecutive UL slots with respect to the SCS of the UL carrier with the same slot indices as the DL slots occurring immediately after measurement gap
when MGTA is applied and the SCS of the UL carrier is other than 15 kHz, in the L consecutive UL slots with respect to the SCS of the UL carrier with the same slot indices as the DL slots occurring immediately after measurement gap
when MGTA is applied and the SCS of the UL carrier is 15 kHz, in the L consecutive UL slots with respect to the SCS of the UL carrier with the same slot indices as the DL slots occurring immediately after the slot partially overlapped with measurement gap
where UL slot denotes that all the symbols in the slot are uplink symbols, and L=1 if $(N_{TA}+N_{TA\ offset}) \times T_C$ for the UL transmission is less than the length of one slot; L=2 otherwise.

$N_{TA}$ is a timing offset between uplink and downlink radio frames at the UE as defined clause 4.2 of 3GPP TS 38.213 v16.5.0 (2021, Mar. 30); $N_{TA\ offset}$ is a fixed timing advance offset as defined in clause 7.1.2.2 of 3GPP TS 38.133; and $T_C$ is a basic time unit as defined in clause 4.1 of 3GPP TS 38.211 v16.5.0 (2021, Mar. 30). Some embodiments describe utilizing this interruption to perform BPS operations.

Figure 3:
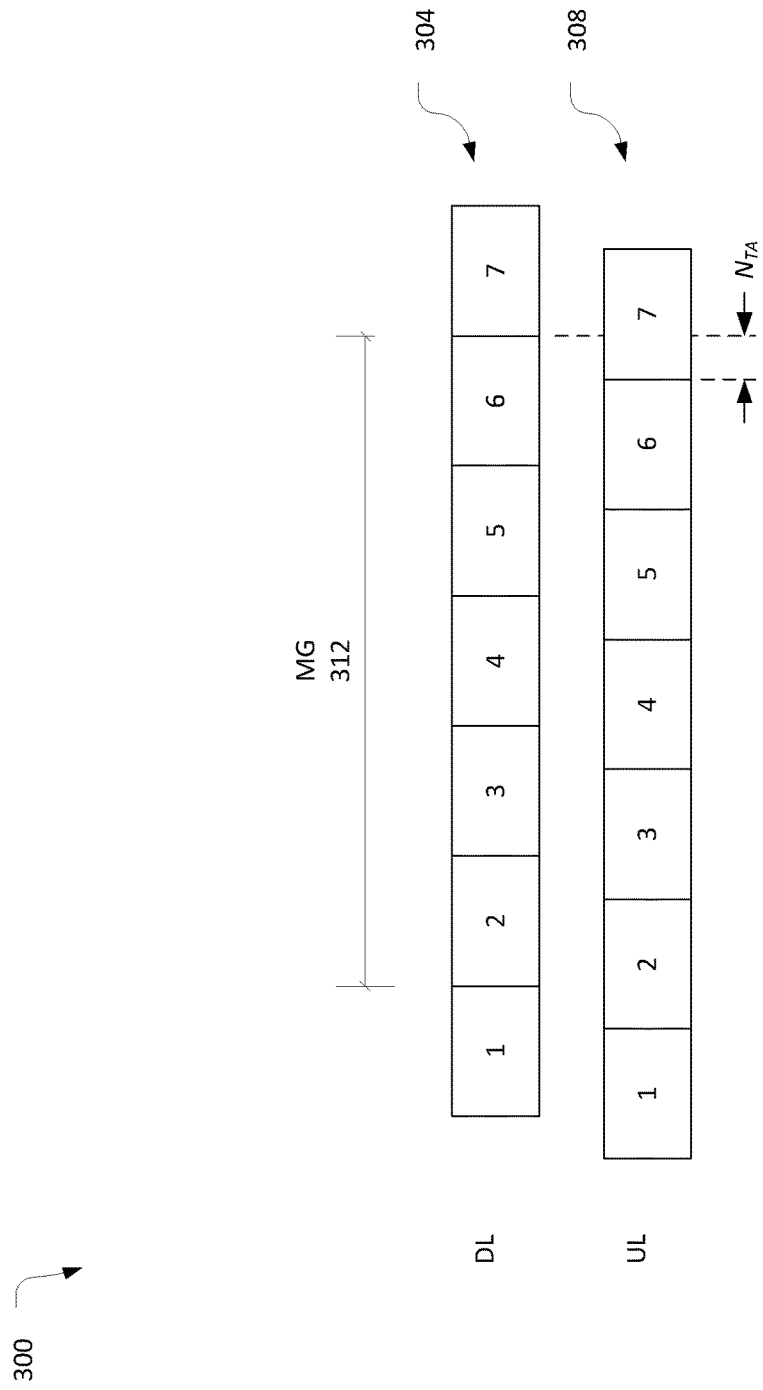
FIG. 3 illustrates a resource timing diagram in accordance with some embodiments.

FIG. 3 is a resource timing diagram 300 in accordance with some embodiments. The resource timing diagram 300 includes downlink (DL) slots 304 and uplink (UL) slots 308. The frame boundaries of the UL slots 308 may be advanced by $N_{TA}$ with respect to frame boundaries of the DL slots 304. A measurement gap 312 may be defined with respect to the frame boundaries of the DL slots 304. Due to the timing advance the measurement gap 312 may partially overlapped with UL slot 7. Consequentially, the UE 104 may not be able to use UL slot 7 for an uplink transmission. Instead, the UE 104 may use the portion of UL slot 7 that is not overlapped with the measurement gap 312 for a BPS operation. While FIG. 3 shows the measurement gap interrupting one UL slot, a measurement gap may interrupt other numbers of UL slots depending on SCS and timing advance. Thus, in some situations the UE 104 may utilize portions of more than one interrupted UL slot for a BPS operation.

More generally, in the L consecutive UL slots with respect to an SCS of the UL carrier with the same slot indices as the DL slots occurring immediately after the measurement gap, the UE 104 may use one or more symbols to perform a BPS sensing transmission within a time range of $\{L \times slot\_length - (N_{TA}+N_{TA\ offset}) \times T_C\}$ immediately after an ending point of a measurement gap, where slot_length is a length of one slot. If $(N_{TA}+N_{TA\ offset}) \times T_C$ for the UL transmission is less than slot_length, L=1. Otherwise, L=2. The value of $N_{TA}$ may be provided by the network (for example, the serving base station) and the $N_{TA\ offset}$ may be a predefined offset for different deployments as described in Table 7.1.2-2 of 3GPP TS 38.133, for example. An UI, slot for this purpose may denote a slot having some or all of its symbols as uplink symbols, In some embodiments, a measurement may be performed on a neighbor cell using MG timing based on a reference cell that is asynchronized with respect to the FR2 (or higher) serving cell. This may cause interruptions on the serving cell communications outside of the measurement gap, which, in turn, may provide an opportunity for BPS operations on the serving cell. In these asynchronous scenarios, the UE 104 may use one or more symbols to perform BPS sensing transmission within a slot portion that is not overlapped with the measurement gap. The slot portion may be a portion of a slot that is partially overlapped with the MG. The partial overlap of the MG may interrupt the communications of that slot. There may be two partially overlapped slots (or "interrupted slots"), one at a beginning of the measurement gap and one at the end.

Figure 4:
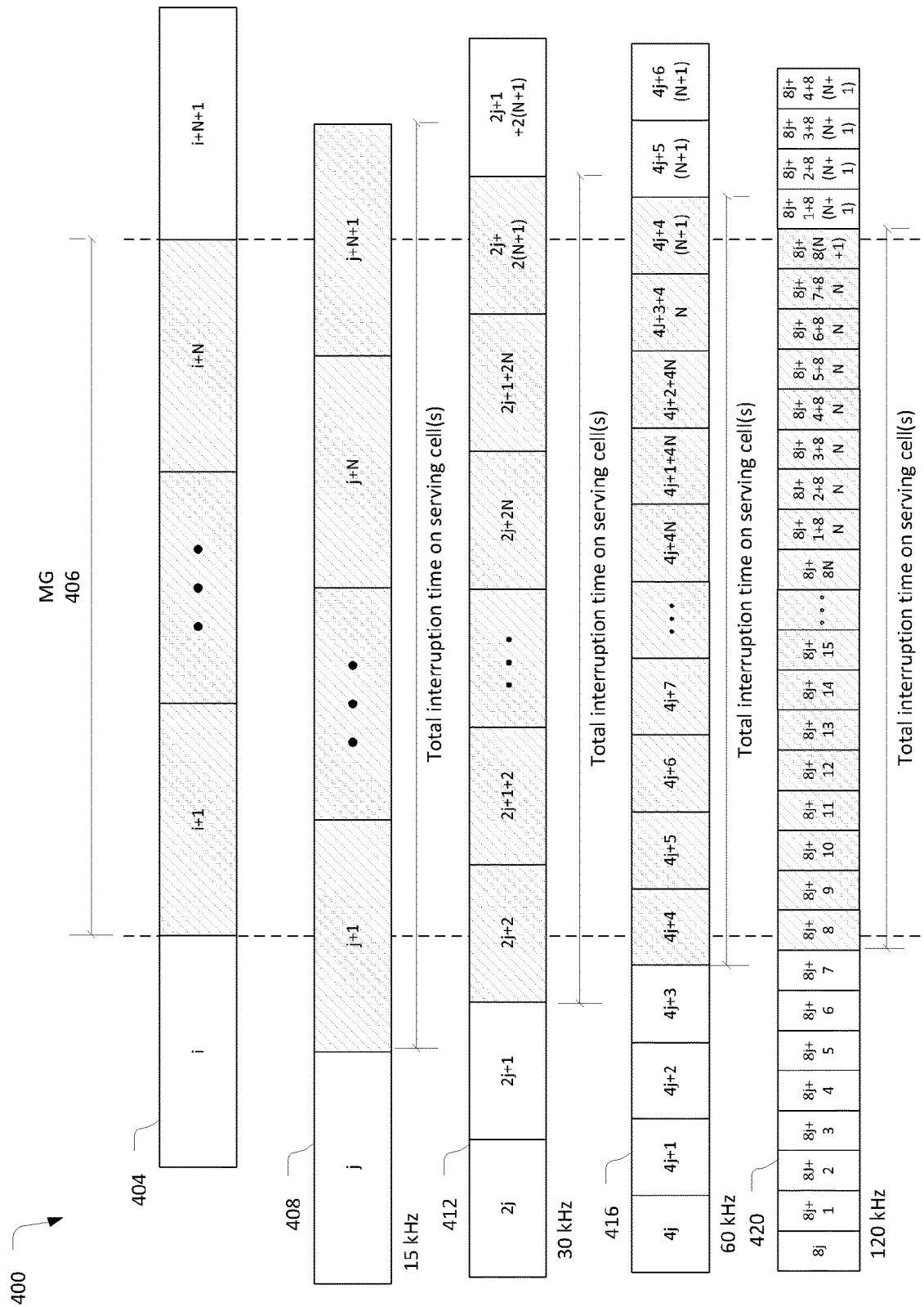
FIG. 4 illustrates additional resource timing diagrams in accordance with some embodiments.

FIG. 4 illustrates resource timing diagrams 400 in accordance with some embodiments. The resource timing diagrams 400 provide a measurement gap 406 with an MG timing advance of 0 milliseconds for all serving cells in asynchronous EN-DC and asynchronous NE-DC and for serving cells in SCG in NR standalone operation (with asynchronous NR-DC configuration)

The resource timing diagrams 400 include a timing diagram 404 for a reference serving cell that serves a basis for defining the measurement gap 406. The resource timing diagrams 400 also include: a timing diagram 408 that corresponds to a serving cell with a 15 kHz SCS; a timing diagram 412 the corresponds to a serving cell with a 30 kHz SCS; a timing diagram 416 that corresponds to a serving cell with a 60 kHz SCS; and a timing diagram 420 the corresponds to a serving cell with a 120 kHz SCS.

As the serving cells are not synchronized with the reference serving cell, the slot boundaries are not aligned. Thus, the total interruption time on the serving cells may be larger than the measurement gap. Some embodiments may use portions of the interrupted slots that are not directly overlapped with the measurement gap 406 for BPS operation. For example, with respect to timing diagram 408, slots j+1 and j+N+1 are both partially overlapped/interrupted slots. Thus, the UE 104 may use portions of these slots that are not directly overlapped with the measurement gap 406 for BPS operations.

Figure 5:
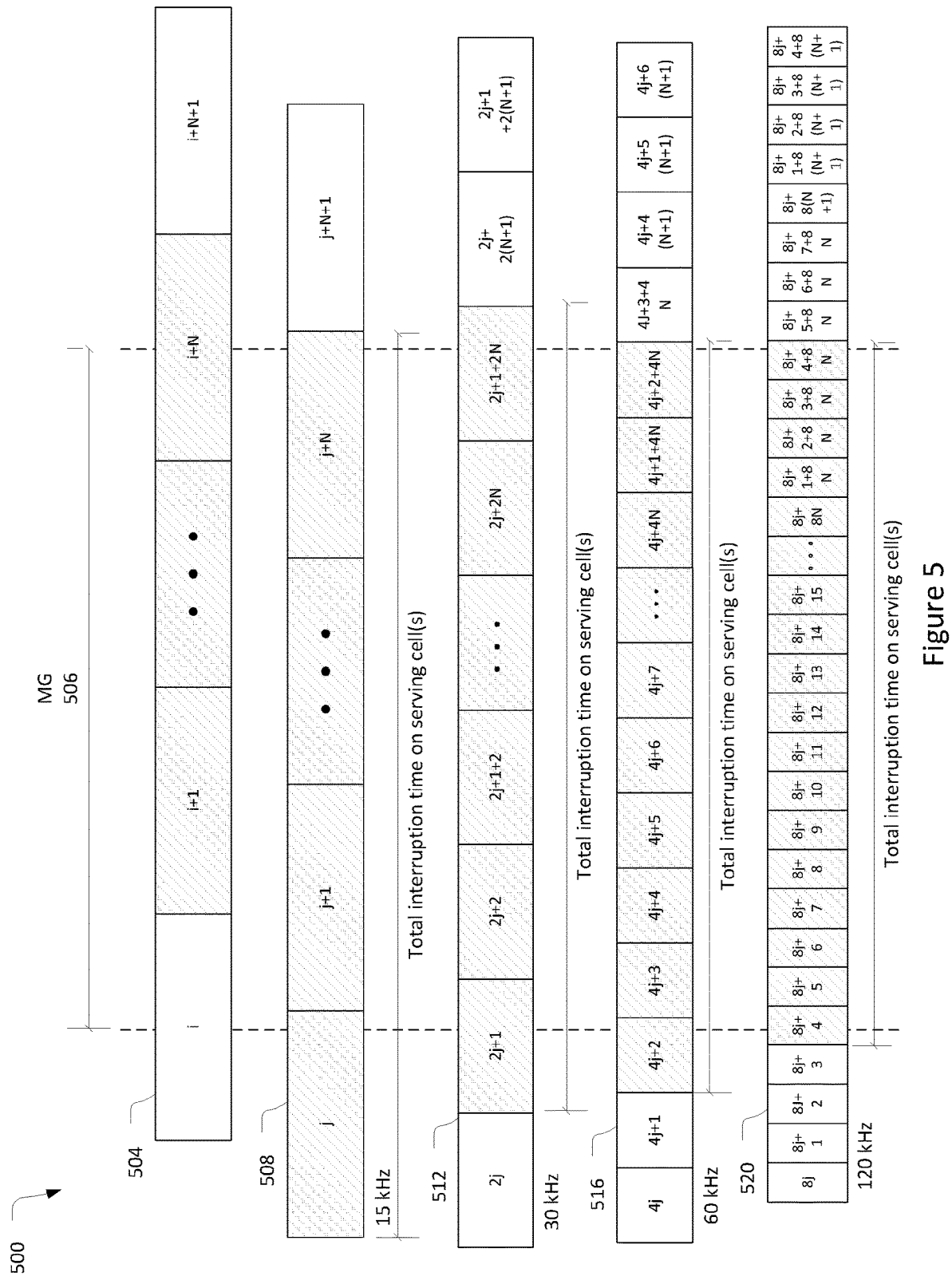
FIG. 5 illustrates additional resource timing diagrams in accordance with some embodiments.

FIG. 5 illustrates resource timing diagrams 500 in accordance with some embodiments. The resource timing diagrams 500 provide a measurement gap 506 with an MG timing advance of 0.5 milliseconds for all serving cells in asynchronous EN-DC and asynchronous NE-DC and for serving cells in SCG in NR standalone operation (with asynchronous NR-DC configuration)

The resource timing diagrams 500 include a timing diagram 504 for a reference serving cell that serves a basis for defining the measurement gap 506. The resource timing diagrams 500 also include: a timing diagram 508 that corresponds to a serving cell with a 15 kHz SCS; a timing diagram 512 the corresponds to a serving cell with a 30 kHz SCS, a timing diagram 516 that corresponds to a serving cell with a 60 kHz SCS; and a timing diagram 520 the corresponds to a serving cell with a 120 kHz SCS.

Similar to the embodiment discussed above with respect to FIG. 4, the asynchronous nature of the serving cells and the reference serving cell cause the total interruption time on the serving cells to be larger than the measurement gap. Therefore, the UE 104 may use the portions of the interfered slots that are not directly overlapped with the measurement gap 506 for BPS operation in a manner similar to that described above.

As described above, in various embodiments the UE 104 may be capable of performing BPS sensing: during an RF tuning margin; based on downlink signal (for example, SSB or CSI-RS) information; based on TDD configuration information; or based on an interruption due to a timing advance or asynchronous serving cells. In some embodiments, the UE 104 may provide the network an indication that it is capable of performing BPS sensing based on one or more of these embodiments. In other embodiments, it may be predefined in, for example, a 3GPP TS, which one or more of these embodiments the UE 104 is to be capable of using for BPS sensing.

To successfully perform a BPS operation, the UE 104 may need a certain number of slots/symbols in a period of time for BPS sensing. This may be indicated by a predetermined threshold of a ratio (Y %) that denotes an expected (or desired) number of slots/symbols for BPS sensing in the period of time. For example, the UE 104 may need Y % of the total number of slots/symbols for performing a BPS operation in a period of time. In other embodiments, Y may simply be a threshold number of slots/symbols instead of a percentage of the total number of slots/symbols.

In some embodiments, if a measurement gap is configured and the available slots/symbols for BPS sensing based on the measurement gap does not meet Y % for a certain period, the network may configure a dedicated UL gap for UE BPS sensing. This may be done based on one or more of the following options.

In a first option, the UL gap and available slots/symbols for BPS sensing based on the measurement gap may be used together for UE BPS sensing. Thus, the network may configure the UL gap such that the available slots/symbols for BPS sensing in the dedicated UL gap and those based on the measurement gap reach Y %.

In a second option, the network may configure the dedicated UL gap such that the available slots/symbols for BPS sensing in the dedicated UL gap reaches Y %. With this option, the UE 104 may rely on the dedicated UL gap to perform BPS sensing. Any available slots/symbols based on the measurement gap may not be needed for BPS sensing in this option.

The dedicated UL, gap configured as part of the first or second option may be configured as an extension of the measurement gap duration on time domain or the dedicated UL gap may be configured independently from the measurement gap.

In a third option, the network may reconfigure parameters of the measurement gap (for example, the measurement gap duration) or reconfigure a TDD configuration in a manner such that the available slots/symbols for BPS sensing based on the measurement gap increases in an amount sufficient to reach Y %.

The UE 104 may provide a report to the network regarding the threshold Y value. The report may include a UE capability or request that may indicate or otherwise relate to the threshold Y value. In some embodiments, the threshold Y value may be predefined as a hard-coded value in, for example, a 3GPP TS.

In the event radio resource management (RRM) occasions from a measurement gap and BPS occasions (for example, slots or symbols) from an uplink gap are overlapped in the time domain, the UE 104 may prioritize one over the other. For example, RRM occasions based on the measurement gap may be prioritized over BPS sensing occasions based on the UL gap. Alternatively, BPS sensing occasions of the UL gap may be prioritized over RRM measurement occasions based on the measurement gap.

If the RRM measurement occasions from the measurement gap and the BPS occasions from uplink gap are fully overlapped, a usage ratio of the RRM measurement occasions based on the measurement gap may be Z % and a usage ratio of the BPS sensing occasions from the UL gap may be 1−Z %. For example, if Z=66, and there are a total of three overlapped occasions, the UE 104 may use two RRM measurement occasions based on the measurement gap and one BPS occasion based on the UL gap. In this manner, the UE 104 may select occasions to perform RRM measurements and BPS operations in proportions consistent with the usage ratio(s).

The value Z may be chosen to meet the BPS sensing needs of the UE 104. The value Z may be provided to the UE 104 from the network. This may be done as part of a proactive configuration or in response to a request from the UE 104. The value Z may additionally/alternatively be predefined in, for example, a 3GPP TS.

If the RRM measurement occasions from the measurement gap and the BPS occasions from an uplink gap are partially overlapped, the UE 104 may prioritize one over the other for the overlapped occasions and may use the original configuration for the non-overlapped occasions. Consider, for example, four occasions, with the first occasion being an RRM measurement occasions based on the measurement gap, the second and third occasions being overlapped RRM measurement/BPS occasions, and the fourth occasion being a BPS occasion from the UL gap. If the RRM measurement occasions are prioritized over the BPS occasions, the UE 104 may use the first, second, and third occasions for RRM measurements and may use the fourth occasion for the BPS.

The prioritization of the overlapped occasions may be designed to meet the BPS sensing needs of the UE 104. The prioritization of the overlapped occasions may be indicated from the network to the UE 104. This may be done as part of a proactive configuration or in response to a request from the UE 104. The prioritization of the overlapped occasions may additionally/alternatively be predefined in, for example, a 3GPP TS, to meet the BPS sensing needs for different overlapping scenarios.

Figure 6:
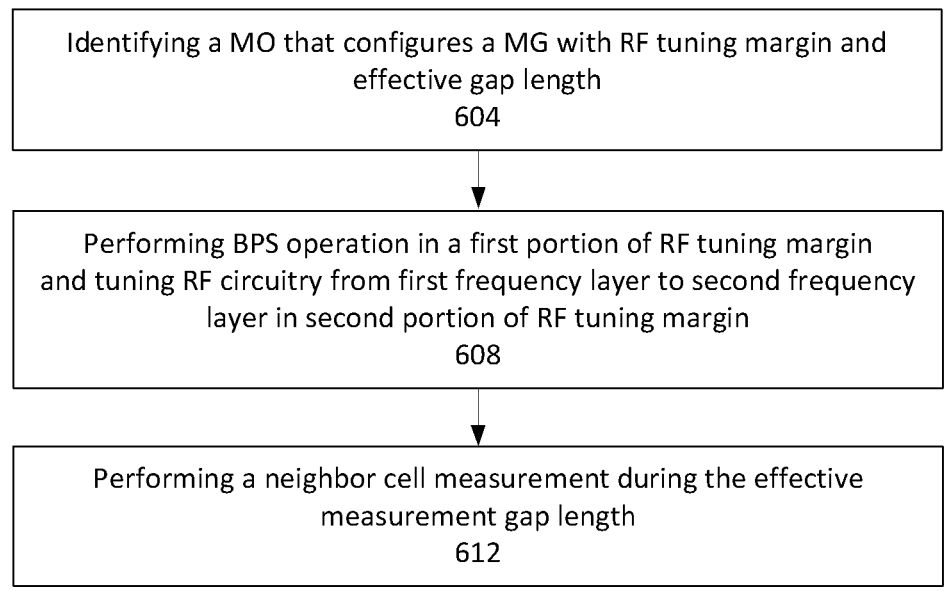
FIG. 6 illustrates an operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE, such as UE 104 or UE 900; or components thereof, for example, baseband processor 904A.

The operation flow/algorithmic structure 600 may include, at 604, identifying an MO that configures an MG with an RF tuning margin and an effective gap length. The MO may configure the UE to perform a neighbor cell measurement for mobility purposes. The MO may be received from a serving base station and may configure the measurement gap on a per-UE basis. The measurement may be an intra-frequency measurement (for example, the neighbor cell is on the same frequency layer as the serving cell) or an inter-frequency measurement (for example, the neighbor cell is on a frequency layer different from the serving cell). In some embodiments, the neighbor cell may be on a frequency layer that is in FR2 or higher.

The operation flow/algorithmic structure 600 may further include, at 608, performing a BPS operation in a first portion of an RF tuning margin and tuning RF circuitry of the UE from a first frequency layer to a second frequency layer in a second portion of the RF tuning margin. The RF tuning margin for the MG may provide a period that is longer than the UE needs to tune its RF circuitry. Thus, the portion of the RF tuning margin that is not needed to tune the RF circuitry may be repurposed for the BPS operation. The portion of the RF tuning margin that is used for the BPS operation may include one or more symbols or slots. For example, if a serving cell has a component carrier with a 60 kHz SCS, and the RF tuning margin is 0.5 ms, the UE may use one slot for the BPS operation and one slot for RF tuning. For another example, if a serving cell has a component carrier with a 120 kHz SCS, and the RF tuning margin is 0.5 ms, the UE may use two slots for the BPS operation and two slots for RF tuning.

The BPS operation may include transmitting a BPS sensing signal/sequence and measuring a reflection of the signal/sequence to determine proximity of a body adjacent to the UE.

The RF tuning margin used for the BPS operation may be at the beginning of the measurement gap or at the end of the measurement gap. In the event the RF tuning margin is at the beginning of the measurement gap, the first frequency layer may be the frequency layer of the serving cell and the second frequency layer may be the frequency layer of the neighbor cell. In this case, the portion of the RF tuning margin used for the BPS operation may come before the portion of the RF tuning margin used to tune the RF circuitry.

In the event the RF tuning margin is at the end of the measurement gap, the first frequency layer may be the frequency layer of the neighbor cell and the second frequency layer may be the frequency layer of the serving cell. In this case, the portion of the RF tuning margin used for the BPS operation may come after the portion of the RF tuning margin used to tune the RF circuitry.

In some embodiments, the UE may determine the relative size of the first/second portion of the RF tuning margin based on a portion ratio that is either predefined or configured by the network.

The operation flow/algorithmic structure 600 may further include, at 612, performing a neighbor cell measurement during the effective measurement gap length. The neighbor cell measurement may be performed on signals transmitted in the neighbor cell including, for example, SSB or CSI-RS.

Figure 7:
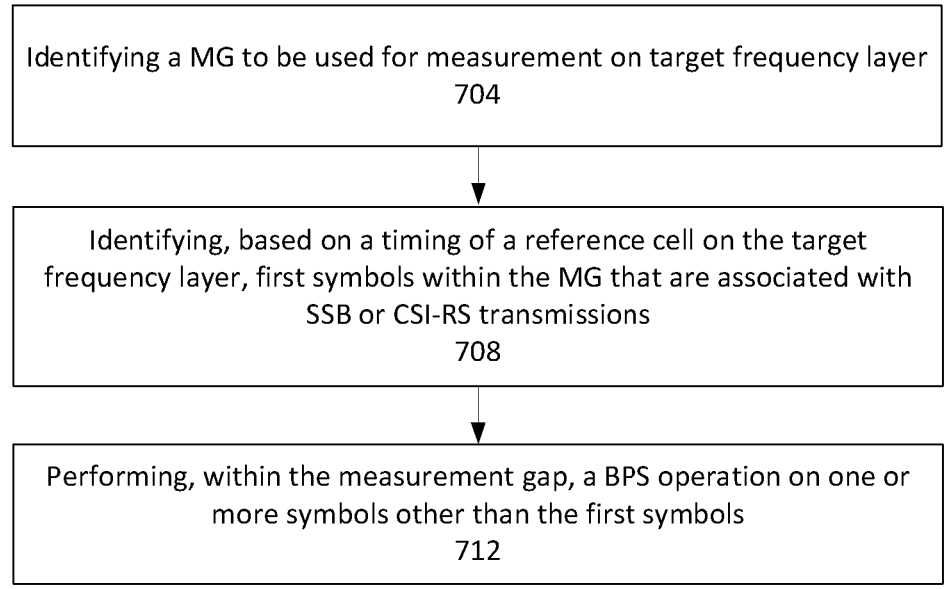
FIG. 7 illustrates another operational flow/algorithmic structure in accordance with some embodiments.

FIG. 7 illustrates an operation flow/algorithmic structure 700 in accordance with some embodiments. The operation flow/algorithmic structure 700 may be performed or implemented by a UE, such as UE 104 or UE 900; or components thereof, for example, baseband processor 904A.

The operation flow/algorithmic structure 700 may include, at 704, identifying a MG to be used for measurement on a target frequency layer. The measurement may be based on signals from a neighbor cell on the target frequency layer. In some embodiments, the UE may be provided an MO to configure the MG as described above.

The operation flow/algorithmic structure 700 may further include, at 708, identifying, based on a timing of a reference cell on the target frequency layer, first symbols within the measurement gap that are associated with SSB or CSI-RS transmissions. The SSB or CSI-RS transmissions may be from a serving cell or a neighbor cell.

If the measurement gap is used for an intra-frequency measurement, the UE may utilize the current serving cell of the UE as the reference cell. Using the serving cell as a reference cell may be enabled due to the assumption that all cells on an intra-frequency layer are synchronized. Thus, the target neighbor cell is assumed to be synchronized with the serving cell. The UE may, therefore, determine the timing of the SSB or CSI-RS transmissions based on timing information from the serving cell.

If the measurement gap is used for an inter-frequency measurement, the UE may identify a cell on the target frequency layer to use as the reference cell. This may be done by detecting SSB symbols from the cell on the target frequency layer. The cell may be the neighbor cell that is the target of the measurements or simply another cell that is on the same frequency layer as the neighbor cell.

The SSB symbols that are included in the first symbols identified at 708 may include symbols that correspond to actual detected SSB symbols for the serving cell of the neighbor cell. For example, if the UE detects an SSB on a first set of symbols (for example, symbols 3-6), the first symbols may include corresponding symbols (for example, symbols 3-6) in later frames/half frames. In other embodiments, the SSB symbols that are included in the first symbols identified at 708 may include all candidate symbols for an SSB. For example, the first symbols may include all possible SSB symbol positions, whether or not an SSB has actually been detected in a corresponding symbol.

The CSI-RS symbols may be symbols on configured CSI-RS L3 symbol positions. These positions may be provided to the UE by the serving base station.

The operation flow/algorithmic structure 700 may further include, at 712, performing the BPS operation within the measurement gap. The BPS operation may be performed on one or more symbols other than the first symbols identified at 708. The BPS operation may be similar to that described above with respect to 612, for example.

In some embodiments, the one or more symbols upon which the BPS operation may be performed may be further limited by other information. For example, the UE may obtain TDD configuration information (of the serving or neighbor cell) and select the one or more symbols as UL symbols and DL symbols that are not associated with the SSB or CSI-RS transmissions.

Figure 8:
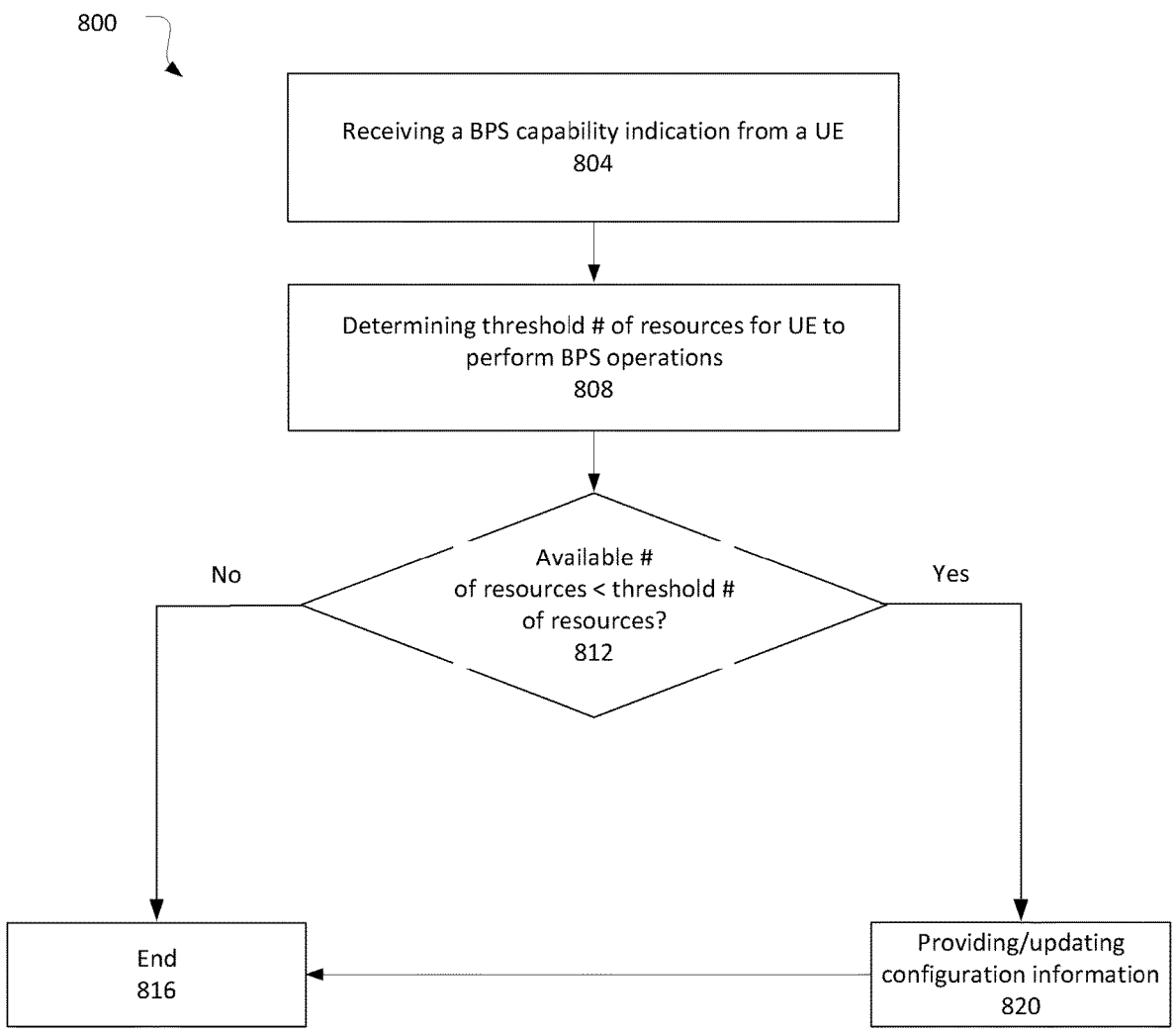
FIG. 8 illustrates another operational flow/algorithmic structure in accordance with some embodiments.

FIG. 8 illustrates an operation flow/algorithmic structure 800 in accordance with some embodiments. The operation flow/algorithmic structure 800 may be performed or implemented by a base station, such as base station 108 or 1000; or components thereof, for example, baseband processor 1004A.

The operation flow/algorithmic structure 800 may include, at 804, receiving a BPS capability indication from the UE. The BPS capability indication may indicate whether the UE is capable of performing a BPS operation based on a measurement gap. In some embodiments, the BPS capability indication may further provide an indication of one or more type(s) of MG-based BPS operations that the UE is capable of performing. For example, the capability indication may indicate that the UE is capable of performing BPS sensing: during an RF tuning margin; based on downlink signal information; based on TDD configuration information; or based on an interruption due to a timing advance or asynchronous serving cells.

The operation flow/algorithmic structure 800 may further include, at 808, determining a threshold number of resources for the UE to perform BPS operations. The threshold number may be a ratio of resources available for BPS operations to a total number of resources for a period of time, or an absolute number of resources available for BPS operations for the period of time.

In some embodiments, the threshold number may be specific to the UE and, therefore, may be signaled from the UE to the base station. This could be signaled as part of, or separate from, the BPS capability indication at 804. In some embodiments, the threshold number may be predefined in, for example, a 3GPP TS. The threshold number may be based on a type of the UE (for example, whether the UE is a high-complexity UE or a low-complexity UE), in which case, the type may be signaled and the base station may determine that the UE has a threshold number that is associated with the specific type.

The operation flow/algorithmic structure 800 may further include, at 812, determining whether an available number of resources is less than a threshold number of resources for the UE to perform the BPS operations. The number of available resources may be determined based on a current gap configuration and the BPS capability of the UE received at 804. For example, if the base station is capable of performing one or more types of MG-based BPS operations and a measurement gap is configured, the base station may determine the number of resources available to the UE for performing the BPS operations based on the configured measurement gap.

If it is determined, at 812, that the available number of resources is not less than a threshold number of resources, the base station may determine that the UE has sufficient resources available for performing the BPS operations. The operation flow/algorithmic structure may then end at 816.

If it is determined, at 812, that the available number of resources is less than the threshold number of resources, the base station may determine that the UE does not have sufficient resources available for performing the BPS operations. The operation flow/algorithmic structure may then advance to providing/updating configuration information at 820. The configuration information provided/updated at 820 may provide the UE with at least the threshold number of resources for performing the BPS operations.

In some embodiments, the base station may provide information to configure an uplink gap that provides at least the threshold number of resources in conjunction with the number of available resources based on the measurement gap. For example, the number of BPS sensing occasions based on the UL gap plus the number of BPS sensing occasions based on the MG is at least equal to the threshold number of resources.

In other embodiments, the base station may provide information to configure an uplink gap that provides at least the threshold number of resources without relying on available resources based on the measurement gap. For example, the number of BPS sensing occasions based on the UL gap is at least equal to the threshold number of resources.

In some embodiments, the base station may reconfigure various MG or TDD parameters to increase the number of available resources based on the measurement gap. This may be done with or without relying on resources from an UL gap to reach the threshold number of resources.

After the configuration information is provided/updated at 820, the operation flow/algorithmic structure 800 may end at 816.

Figure 9:
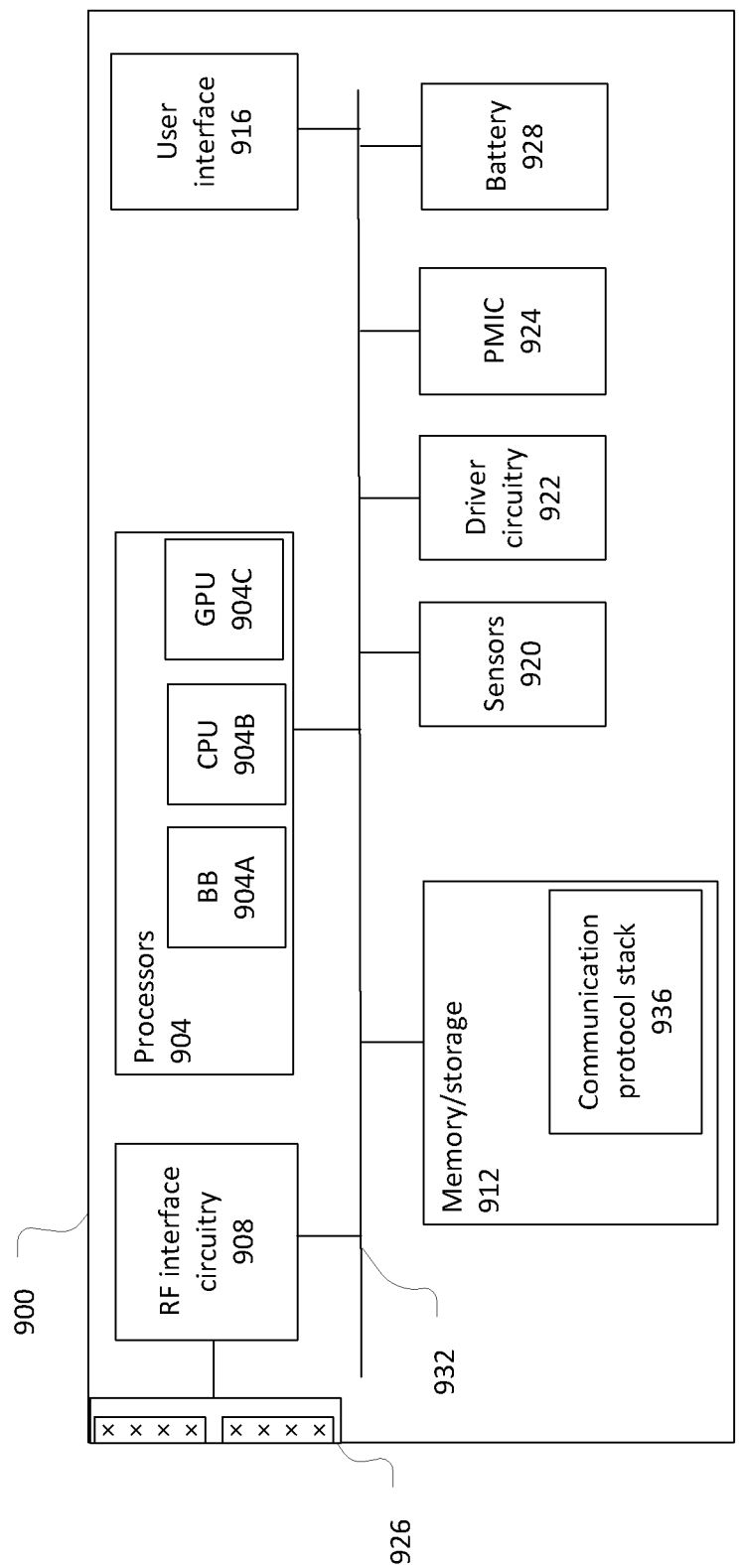
FIG. 9 illustrates a user equipment in accordance with some embodiments.

FIG. 9 illustrates a UE 900 in accordance with some embodiments. The UE 900 may be similar to and substantially interchangeable with UE 94 of FIG. 1.

The UE 900 may be any mobile or non-mobile computing device, such as a mobile phone, a computer, a tablet, an industrial wireless sensor (for example, a microphone, carbon dioxide sensor, pressure sensor, humidity sensor, thermometer, motion sensor, accelerometer, laser scanner, fluid level sensor, inventory sensor, electric voltage/current meter, or actuator), a video surveillance/monitoring device (for example, a camera), a wearable device (for example, a smart watch), or an Internet-of-Things device.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, or optical connection that allows various circuit components (on common or different chips or chipsets) to interact with one another.

The processors 904 may include processor circuitry, such as baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed. by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 may additionally include data to facilitate these operations including, for example, gap configuration information and capability information related to performing BPS operations based on measurement gaps.

The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random-access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, or control circuitry.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include, for example, micro-strip antennas, printed antennas fabricated on the surface of one or more printed circuit boards, patch antennas, or phased array antennas. The antenna 926 may have one or more panels designed for specific frequency bands including bands in FR1, FR2, or higher.

The user interface circuitry 916 includes various input/output (I/O) devices designed toenable user interaction with the UE 900. The user interface 916 includes input device circuitry and output device circuitry. Input device circuitry includes any physical or virtual means for accepting an input including, for example, one or more physical or virtual buttons (for example, a reset button), a physical keyboard, keypad, mouse, touchpad, touchscreen, microphones, scanner, or headset. The output device circuitry includes any physical or virtual means for showing information or otherwise conveying information, such as sensor readings, actuator position(s), or other like information. Output device circuitry may include any number or combinations of audio or visual display, including, for example, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, or projectors), with the output of characters, graphics, or multimedia objects, being generated or produced from the operation of the UE 900.

The sensors 920 may include devices, modules, or subsystems whose purpose is to detect events or changes in its environment and send the information (sensor data) about the detected events to some other device, module, or subsystem. Examples of such sensors include, for example, inertia measurement units comprising accelerometers, gyroscopes, or magnetometers; microelectromechanical systems or nanoelectromechanical systems comprising 3-axis accelerometers, 3-axis gyroscopes, magnetometers; level sensors; flow sensors; temperature sensors (for example, thermistors); pressure sensors; barometric pressure sensors; gravimeters; altimeters; image capture devices (for example, cameras or lens-less apertures); light detection and ranging sensors; proximity sensors (for example, infrared radiation detector and the like); depth sensors; ambient light sensors; ultrasonic transceivers; or microphones or other like audio capture devices.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900 including DRX as discussed herein.

A battery 928 may power the UE 900, although in some examples the UE 900 may be mounted deployed in a fixed location, and may have a power supply coupled to an electrical grid. The battery 928 may be a lithium-ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
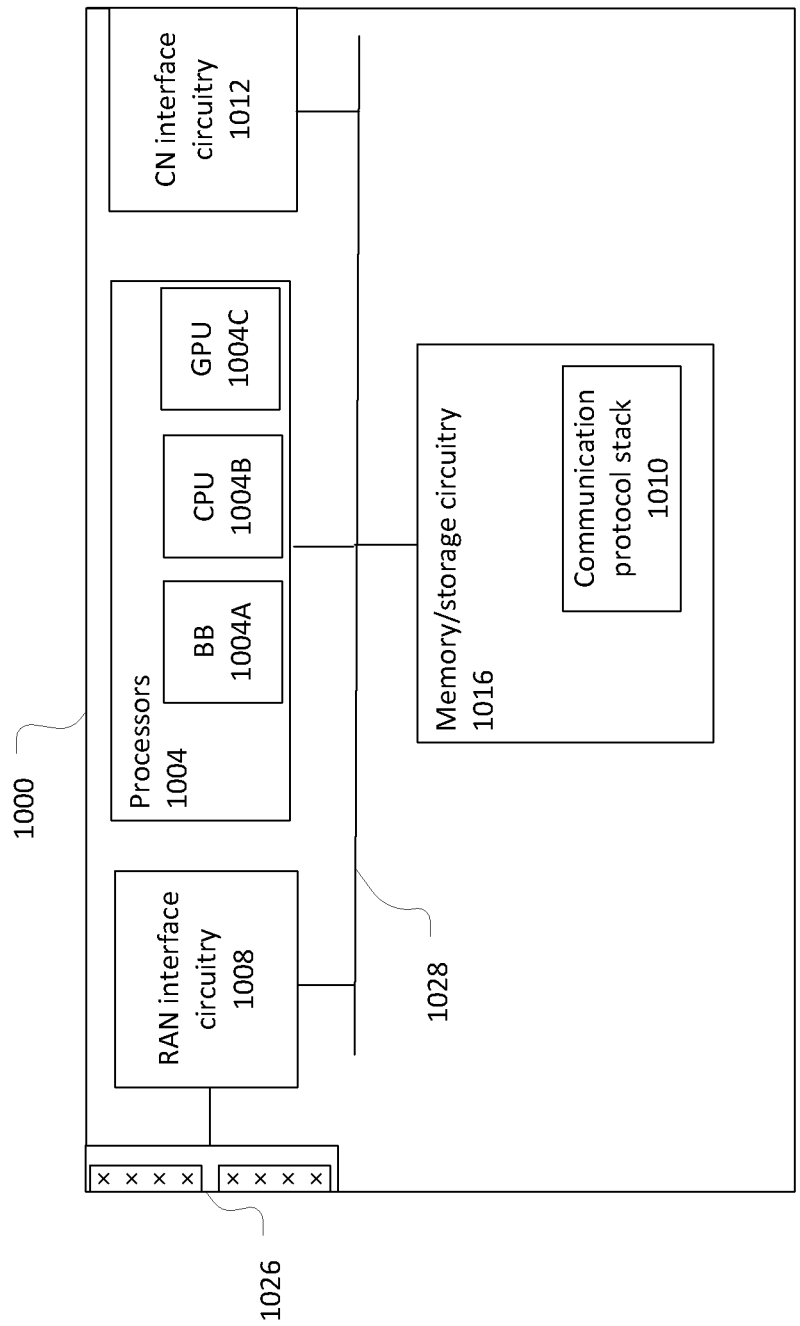
FIG. 10 illustrates a base station in accordance with some embodiments.

FIG. 10 illustrates a gNB 1000 in accordance with some embodiments. The gNB node 1000 may similar to and substantially interchangeable with base station 108 of FIG. 1.

The gNB 1000 may include processors 1004, RF interface circuitry 1008, core network "CN" interface circuitry 1012, memory/storage circuitry 1016, and antenna structure 1026.

The components of the gNB 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a Fifth Generation Core network (5GC) using a 5GC-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE or base station as described. above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: identifying a measurement object that configures a measurement gap with a radio frequency (RF) tuning margin and an effective measurement gap length; performing a body proximity sensing (BPS) operation in a first portion of the RF tuning margin; tuning RF circuitry from a first frequency layer to a second frequency layer during a second portion of the RF tuning margin; and performing a measurement during the effective measurement gap length.

Example 2 includes the method of example 1 or some other example herein, wherein a subcarrier spacing of a serving cell component carrier is 60 kilohertz (kHz) and the first and second portions are each one slot.

Example 3 includes the method of example 1 or some other example herein, wherein a subcarrier spacing of a serving cell component carrier is 120 kiloHertz (kHz) and the first and second portions are each two slots.

Example 4 includes the method of example 1 or some other example herein, wherein the measurement object configures the measurement gap on a per-UE basis.

Example 5 includes the method of example 1 or some other example herein, further comprising: identifying a portion ratio that is predefined or configured by a network; and determining relative sizes of the first and second portions based on the portion ratio.

Example 6 includes a method of example 1 or some other example herein, further comprising performing the BPS operation on the first frequency layer, which corresponds to a serving cell; and performing the measurement on the second frequency layer, which corresponds to a target cell, after said performing of the BPS operation.

Example 7 includes the method of example 6 or some other example herein, wherein the BPS operation is a first BPS operation, the RF tuning margin is a first RF tuning margin, and the method further comprises: after performing the measurement during the effective measurement gap length, tuning the RF circuitry from the second frequency layer to the first frequency layer in a first portion of a second RF tuning margin; and performing a second BPS operation on the first frequency layer in a second portion of the second RF tuning margin.

Example 8 includes a method of operating a user equipment (UE), the method comprising: identifying a measurement gap to be used for a measurement on a target frequency layer; identifying, based on a timing of a reference cell on the target frequency layer, first symbols within the measurement gap that are associated with synchronization signal block (SSB) or channel state information-reference signal (CSI-RS) transmission; and performing a body proximity sensing (BPS) operation during one or more symbols in the measurement gap, wherein the one or more symbols do not include the first symbols.

Example 9 includes the method of example 8 or some other example herein, wherein the measurement is an intra-frequency measurement, the reference cell is a serving cell of the UE, and the method further comprises: detecting an SSB from the serving cell; and determining the timing of the reference cell based on the SSB.

Example 10 includes the method of example 8 or some other example herein, wherein the measurement is an inter-frequency measurement, the reference cell is a neighbor cell, and the method further comprises: detecting an SSB from the neighbor cell; determining the timing of the reference cell based on the SSB; and performing the measurement on the neighbor cell or another neighbor cell on the target frequency layer.

Example 11 includes the method of example 10 or some other example herein, further comprising: detecting SSB on a plurality of symbols, wherein the first symbols correspond to the plurality of symbols.

Example 12 includes the method of example 11 or some other example herein, wherein the SSB is transmitted from a serving cell or a neighbor cell.

Example 13 includes the method of example 8 or some other example herein, further comprising: determining a plurality of candidate symbols for an SSB, wherein the first symbols correspond to the plurality of candidate symbols.

Example 14 includes the method of example 8 or some other example herein, further comprising: receiving information to configure a plurality of symbols for CSI-RS for a serving cell or a neighbor cell, wherein the first symbols correspond to the plurality of symbols.

Example 15 includes a method of operating a user equipment (UE), the method comprising: identifying a time division duplex (TDD) uplink (UL)/downlink (DL) configuration; identifying a measurement gap to be used for a measurement on a target frequency layer; selecting one or more uplink symbols based on the TDD UL/DL configuration; and performing a body proximity sensing (BPS) operation during the one or more uplink symbols.

Example 16 includes the method of example 15 or some other example herein, wherein the measurement is an intra-frequency measurement and the method further comprises: acquiring system information from a serving cell on the target frequency layer; and identifying the TDD UL/DL configuration based on the system information.

Example 17 includes the method of example 15 or some other example herein, wherein the measurement is an inter-frequency measurement and the method further comprises: acquiring system information from a neighbor cell on the target frequency layer; identifying the TDD UL/DL configuration based on the system information; and performing the measurement on the neighbor cell or another neighbor cell on the target frequency layer.

Example 18 includes the method of example 15 or some other example herein, further comprising: receiving, from a base station, a signal that includes an indicator of the TDD UL/DL configuration, wherein the indicator is in a radio resource control (RRC) information element, a media access control (MAC) control element, or downlink control information (DCI); and identifying the TDD UL/DL configuration based on the indicator.

Example 19 includes a method of operating a user equipment (UE), the method comprising: receiving information to configure a measurement gap; determining that the measurement gap interferes with an uplink slot that follows the measurement gap based on a timing advance associated with the uplink slot; and performing a body proximity sensing (BPS) operation during at least one symbol of the uplink slot.

Example 20 includes the method of example 19 or some other example herein, wherein the uplink slot is a first uplink slot and the method further comprises: determining that the measurement gap interferes with a second uplink slot that is consecutive with the first uplink slot; and performing the BPS operation during at least one symbol of the second uplink slot.

Example 21 includes a method of operating a user equipment (UE), the method comprising: determining timing of a measurement gap based on a reference cell that is asynchronized with a serving cell; detecting a slot of the serving cell that includes a first portion that is overlapped with the measurement gap and a second portion that is not overlapped with the measurement gap; and performing a body proximity sensing (BPS) operation during at least one symbol in the second portion of the slot.

Example 22 includes the method of example 21 or some other example herein, wherein the slot is at a beginning of the measurement gap or an end of the measurement gap.

Example 23 includes a method of operating a base station, the method comprising: receiving an indication of a capability of a user equipment (UE) to perform body proximity sensing (BPS) operations based on a measurement gap configuration; determining a threshold number of resources for the UE to perform the BPS operations in a period of time; determining, based on the capability and the threshold number, that a number of resources available based on the measurement gap configuration is insufficient for the UE to perform the BPS operations in the period of time, and providing a configuration to the UE based on said determining that the number of resources available based on the measurement gap configuration is insufficient.

Example 24 includes the method of example 23 or some other example herein, wherein the configuration is an uplink gap configuration or an updated measurement gap configuration.

Example 25 includes the method of example 23 or some other example herein, wherein the indication of the capability is to indicate that the UE is capable of performing the BPS operations based on a time division duplex (TDD) configuration and the configuration is an updated TDD configuration.

Example 26 includes the method of example 23 or some other example herein, wherein the number of resources available based on the measurement gap configuration is a first number of resources and the method further comprises: providing the configuration as an uplink gap configuration with a second number of resources, wherein the first number of resources and the second number of resources collectively provide at least the threshold number of resources.

Example 27 includes the method of example 23 or some other example herein, wherein the number of resources available based on the measurement gap configuration is a first number of resources and the method further comprises: providing the configuration as an updated measurement gap configuration with a second number of resources, wherein the second number of resources provides at least the threshold number of resources.

Example 28 includes the method of example 23 or some other example herein, wherein the number of resources available based on the measurement gap configuration is a first number of resources and the method further comprises: providing the configuration as an uplink gap configuration with a second number of resources, wherein the second number of resources provides at least the threshold number of resources.

Example 29 includes the method of example 23 or some other example herein, further comprising: receiving a message from the UE; and determining the threshold number based on the message.

Example 30 includes the method of example 23 or some other example herein, wherein the indication of the capability is to indicate that the UE is capable of performing BPS sensing: during a radio frequency (RF) tuning margin; based on downlink signal information; based on time division duplex (TDD) configuration information; or based on an interruption due to a timing advance or asynchronous serving cells.

Example 31 includes a method of operating a user equipment (UE), the method comprising: detecting a radio resource management (RRM) measurement occasion based on a measurement gap; detecting a body proximity sensing (BPS) occasion based on a dedicated uplink gap, wherein the RRM measurement occasion is overlapped with the BPS occasion in a time domain; determining a relative priority between the RRM measurement occasion and the BPS occasion; and performing an RRM measurement in the RRM measurement occasion or a BPS operation in the BPS occasion based on the relative priority.

Example 32 includes the method of example 31 or some other example herein, further comprising: detecting at least one RRM measurement occasion based on the measurement gap; detecting one or more BPS occasions based on the uplink gap, wherein the at least one RRM measurement occasion and the one or more BPS occasions are fully overlapped; identifying a usage ratio; selecting occasions to use for REM measurements and to use for BPS operations in proportions consistent with the usage ratio; and performing the RRM measurements and BPS operations in the selected occasions.

Example 33 includes the method of example 32 or some other example herein, further comprising: receiving an indication of the usage ratio from a base station.

Example 34 includes the method of example 33 or some other example herein, further comprising: transmitting, to the base station, a request for the usage ratio.

Example 35 includes the method of example 31 or some other example herein, further comprising: receiving an indication of the relative priority from a base station.

Example 36 includes a method of example 31 or some other example herein, further comprising: detecting a second BPS occasion that does not overlap with any RRM measurement occasion; and performing a BPS operation in the second BPS occasion.

Example 37 may include an apparatus comprising means to perform one or more elements of a method described in or related to any of examples 1-36, or any other method or process described herein.

Example 38 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 39 may include an apparatus comprising logic, modules, or circuitry to perform one or more elements of a method described in or related to any of examples 1-36, or any other method or process described herein.

Example 40 may include a method, technique, or process as described in or related to any of examples 1-36, or portions or parts thereof.

Example 41 may include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 42 may include a signal as described in or related to any of examples 1-36, or portions or parts thereof.

Example 43 may include a datagram, information element, packet, frame, segment, PDU, or message as described in or related to any of examples 1-36, or portions or parts thereof, or otherwise described in the present disclosure.

Example 44 may include a signal encoded with data as described in or related to any of examples 1-36, or portions or parts thereof, or otherwise described in the present disclosure.

Example 45 may include a signal encoded with a datagram, IE, packet, frame, segment, PDU, or message as described in or related to any of examples 1-36, or portions or parts thereof, or otherwise described in the present disclosure.

Example 46 may include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 47 may include a computer program comprising instructions, wherein execution of the program by a processing element is to cause the processing element to carry out the method, techniques, or process as described in or related to any of examples 1-36, or portions thereof.

Example 48 may include a signal in a wireless network as shown and described herein.

Example 49 may include a method of communicating in a wireless network as shown and described herein.

Example 50 may include a system for providing wireless communication as shown and described herein.

Example 51 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    identifying a measurement object that configures a measurement gap with a radio frequency (RF) tuning margin and an effective measurement gap length;
    performing a body proximity sensing (BPS) operation in a first portion of the RF tuning margin;
    tuning RF circuitry from a first frequency layer to a second frequency layer during a second portion of the RF tuning margin; and
    performing a measurement during the effective measurement gap length.

2. The method of claim 1, wherein a subcarrier spacing of a serving cell component carrier is 60 kiloHertz (kHz) and the first and second portions are each one slot.

3. The method of claim 1, wherein a subcarrier spacing of a serving cell component carrier is 120 kiloHertz (kHz) and the first and second portions are each two slots.

4. The method of claim 1, wherein the measurement object configures the measurement gap on a per-user equipment (UE) basis.

5. The method of claim 1 further comprising:
    identifying a portion ratio that is predefined or configured by a network; and
    determining relative sizes of the first and second portions based on the portion ratio.

6. The method claim 1, further comprising:
    performing the BPS operation on the first frequency layer, which corresponds to a serving cell; and
    performing the measurement on the second frequency layer, which corresponds to a target cell, after said performing of the BPS operation.

7. The method of claim 6, wherein the BPS operation is a first BPS operation, the RF tuning margin is a first RF tuning margin, and the method further comprises:
    after performing the measurement during the effective measurement gap length, tuning the RF circuitry from the second frequency layer to the first frequency layer in a first portion of a second RF tuning margin; and performing a second BPS operation on the first frequency layer in a second portion of the second RF tuning margin.

8. One or more non-transitory, computer-readable media having instructions that, when executed, cause processing circuitry to:
    identify a measurement gap to be used for a measurement on a target frequency layer;
    identify, based on a timing of a reference cell on the target frequency layer, first symbols within the measurement gap that are associated with synchronization signal block (SSB) or channel state information-reference signal (CSI-RS) transmission; and
    perform a body proximity sensing (BPS) operation during one or more symbols in the measurement gap, wherein the one or more symbols do not include the first symbols.

9. The one or more non-transitory, computer-readable media of claim 8, wherein the measurement is an intra-frequency measurement, the reference cell is a serving cell of the processing circuitry, and the instructions, when executed, further cause the processing circuitry to:
    detect an SSB from the serving cell; and
    determine the timing of the reference cell based on the SSB.

10. The one or more non-transitory, computer-readable media of claim 8, wherein the measurement is an inter-frequency measurement, the reference cell is a neighbor cell, and the instructions, when executed, further cause the processing circuitry to:
    detect an SSB from the neighbor cell;
    determine the timing of the reference cell based on the SSB; and
    perform the measurement on the neighbor cell or another neighbor cell on the target frequency layer.

11. The one or more non-transitory, computer-readable media of claim 8, wherein the instructions, when executed, further cause the processing circuitry to:
    detect an SSB on a plurality of symbols, wherein the first symbols correspond to the plurality of symbols.

12. The one or more non-transitory, computer-readable media of claim 11, wherein the SSB is transmitted from a serving cell or a neighbor cell.

13. The one or more non-transitory, computer-readable media of claim 8, wherein the instructions, when executed, further cause the processing circuitry to:
    determine a plurality of candidate symbols for an SSB, wherein the first symbols correspond to the plurality of candidate symbols.

14. The one or more non-transitory, computer-readable media of claim 8, wherein the instructions, when executed, further cause the processing circuitry to:
    receive information to configure a plurality of symbols for CSI-RS for a serving cell or a neighbor cell, wherein the first symbols correspond to the plurality of symbols.

15. One or more non-transitory, computer-readable media having instructions that, when executed, cause processing circuitry to:
    receive an indication of a capability of a user equipment (UE) to perform body proximity sensing (BPS) operations based on a measurement gap configuration;
    determine a threshold number of resources for the UE to perform the BPS operations in a period of time;
    determine, based on the capability and the threshold number, that a number of resources available based on the measurement gap configuration is insufficient for the UE to perform the BPS operations in the period of time; and
    provide a configuration to the UE based on said determining that the number of resources available based on the measurement gap configuration is insufficient.

16. The one or more non-transitory, computer-readable media of claim 15, wherein the configuration is an uplink gap configuration or an updated measurement gap configuration.

17. The one or more non-transitory, computer-readable media of claim 15, wherein the indication of the capability is to indicate that a user equipment is capable of performing the BPS operations based on a time division duplex (TDD) configuration and the configuration is an updated TDD configuration.

18. The one or more non-transitory, computer-readable media of claim 15, wherein the number of resources available based on the measurement gap configuration is a first number of resources and the instructions, when executed, further cause the processing circuitry to:
    provide the configuration as an uplink gap configuration with a second number of resources, wherein the first number of resources and the second number of resources collectively provide at least the threshold number of resources.

19. The one or more non-transitory, computer-readable media of claim 15, wherein the number of resources available based on the measurement gap configuration is a first number of resources and the instructions, when executed, further cause the processing circuitry to:
    provide the configuration as an updated measurement gap configuration with a second number of resources, wherein the second number of resources provides at least the threshold number of resources.

20. The one or more non-transitory, computer-readable media of claim 15, wherein the number of resources available based on the measurement gap configuration is a first number of resources and the instructions, when executed, further cause the processing circuitry to:
    provide the configuration as an uplink gap configuration with a second number of resources, wherein the second number of resources provides at least the threshold number of resources.

* * * * *